(12) United States Patent
Uh

(10) Patent No.: US 7,875,384 B2
(45) Date of Patent: Jan. 25, 2011

(54) SECONDARY BATTERY

(75) Inventor: Hwa-Il Uh, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 930 days.

(21) Appl. No.: 11/642,854

(22) Filed: Dec. 21, 2006

(65) Prior Publication Data

US 2007/0154796 A1 Jul. 5, 2007

(30) Foreign Application Priority Data

Dec. 29, 2005 (KR) .................. 10-2005-0134528

(51) Int. Cl.
*H01M 2/08* (2006.01)
*H01M 2/00* (2006.01)
(52) U.S. Cl. .................. 429/174; 429/163; 429/175
(58) Field of Classification Search .................. 429/163, 429/175, 174, 170
See application file for complete search history.

(56) References Cited

U.S. PATENT DOCUMENTS 6,524,732 B1   2/2003   Iwaizono et al.
6,759,152 B2 *  7/2004   Iwaizono et al. ............... 429/7

FOREIGN PATENT DOCUMENTS

| EP | 1 309 020 A | 5/2003 |
|---|---|---|
| EP | 1 492 176 A1 | 12/2004 |
| JP | 2000-285969 | 10/2000 |
| JP | 2001-148259 | 5/2001 |
| JP | 2002-110121 | 4/2002 |
| JP | 2002-164077 | 6/2002 |
| JP | 2003-022789 | 1/2003 |

* cited by examiner

*Primary Examiner*—Patrick Ryan
*Assistant Examiner*—Julian Mercado
(74) *Attorney, Agent, or Firm*—Robert E. Bushnell, Esq.

(57) ABSTRACT

Disclosed is a secondary battery which can prevent twist or bend of a mold resin part of the battery. In one embodiment, a side wall extension part is formed on a top edge of a side wall of a can of the battery. The side wall extension part protrudes upwardly from the top edge of the side wall, and partially encloses a mole resin part that is formed on the top of the can. In another embodiment, a protrusion part is formed on an edge of an upper plane of a cap plate that covers the can of the battery. The protrusion part protrudes upwardly from the upper plane of the cap plate, partially encloses a mole resin part that is formed on the upper plane of the cap plate. In both embodiments, the protruded part adheres to the mold resin part, and supports the mold resin part to prevent mechanical distortion that can be caused by external force. Therefore, the protruded part improves the reliability of the battery.

12 Claims, 4 Drawing Sheets

SECONDARY BATTERY

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on 29 Dec. 2005 and there duly assigned Serial No. 10-2005-0134528.

BACKGROUND OF THE INVENTION

1. Field of the Invention

The present invention relates to a secondary battery, and more particularly, to a secondary battery that improves reliability by preventing a mold resin part from being twisted and bent. A protrusion is formed either on a top edge of a side wall of a can of the battery or on an edge of an upper plane of a cap plate that covers the can of the battery. The protrusion adheres to the mold resin part, and supports the mold resin part to prevent mechanical distortion that is caused by external force.

2. Description of the Related Art

A secondary battery is a battery capable of repeatedly being charged and discharged for several times, which is different from a first battery that can not be charged. The secondary battery has been broadly used for an electronic device, such as a cellular phone, a notebook computer, a camcorder, and others.

An output voltage of a lithium secondary battery is typically 3.6 volt, which is three times higher than an output voltage of a nickel-cadmium battery or a nickel-hydrogen battery that has been often used as a power source of electronic equipments. The lithium secondary battery has higher energy density per unit weight than the nickel-cadmium battery or the nickel-hydrogen battery. Therefore, the use of the lithium secondary battery has been rapidly increased.

The lithium secondary battery mainly uses a lithium-based oxide as a cathode active material, and a carbon material as an anode active material. Further, the lithium secondary battery has been manufactured in various shapes such as a cylindrical shape, a polygon shape, a pouch shape, and others.

Among them, a polygon-shaped secondary battery includes a bare cell, a protection circuit board, and a mold resin part. The bare cell includes an electrode assembly, a can that accommodates the electrode assembly, and a cap assembly that is attached to an opening formed on the top of the can. The cap assembly includes a cap plate that covers the top of the electrode assembly.

The protection circuit board includes a protection circuit that protects the battery from being overcharged or over-discharged during charging/discharging process. The protection circuit board can be electrically connected to both electrodes of the bare cell through a lead plate or others.

The mold resin part is formed by filling a space between the cap plate of the bare cell and the protection circuit board with hot melted resin, followed by solidification. The mold resin part prevents battery components, which are placed between the cap plate and the protection circuit board, from being dislocated or being distorted.

A holder may be positioned at a portion of the upper surface of the cap plate in order to improve the connection between the cap plate and the mold resin part. The holder prevents a dislocation of the mold resin part from the cap plate by external force, such as twist and bend, and also prevents the mold resin part from being separated from the cap plate.

The holder has a shape of a simple rectangular parallelepiped. A protrusion formed on the upper surface of the cap plate is inserted into a groove formed on the bottom surface of the holder in order to fix the holder to the cap plate.

The battery, however, has various components that should be installed in a space between the cap plate and the protection circuit board, where the mold resin part is filled. For example, an electrolyte inlet and a stopper can be positioned in the space. A vent can be formed in the space to secure battery stability. A thermal breaker or a positive temperature coefficient (PTC) element can be placed in the space. A lead plate can be placed in the space to electrically connect two connection terminals of the protection circuit board to each other. As a result, the space, in which the holder is installed, is remarkably limited.

Accordingly, the size of the holder is also limited, and thus the connection between the cap plate and the mold resin part is not strong enough to resist external forces. Consequently, the loose connection causes problems that the position of the mold resin part changes relatively from the cap plate or the mold resin part is separated from the cap plate. Furthermore, additional time and cost for manufacturing the holder are required, which causes an increase in overall manufacturing cost.

SUMMARY OF THE INVENTION

Accordingly, an object of the present invention is to provide an improved secondary battery. It is another object to provide a secondary battery which is able to prevent a mold resin part from being twisted and bent, by forming a protrusion part either on the top of a side wall of a can or an edge of a plane of a cap plate. The protrusion protrudes upwards from the plane of the cap plate and adheres to the mold resin part.

Additional advantages, objects and features of the invention will be set forth in part in the description which follows and in part will become apparent to those having ordinary skill in the art upon examination of the following or may be learned from practice of the invention.

According to an aspect of the present invention, there is provided a secondary battery, which includes a can having an open top and a side wall, an electrode assembly accommodated inside the can and producing electricity, a cap assembly disposed on the top of the can and including a cap plate that has a plane covering an opening of the open top of the can, a protection circuit board disposed on the top of the cap assembly, a mold resin part formed between the cap plate and the protection circuit board, and a side wall extension part formed on an top edge of the side wall of the can. The side wall extension part protrudes upwards beyond the cap plate, and adheres to the mold resin part.

The side wall extension part protrudes in a direction substantially perpendicular to the plane of the cap plate, and a height of the side wall extension part can be smaller than a height of the mold resin part.

The battery can further includes a seating groove formed on an inner side surface of the side wall of the can. The seating groove is coupled to the cap plate. The battery also can further include a connection terminal connected to the protection circuit board. The connection terminal is electrically connected to the side wall extension part.

According to another aspect of the prevent invention, there is provided a secondary battery, which includes a can having an open top and a side wall, an electrode assembly accommodated inside the can and producing electricity, a cap assembly disposed on the top of the can and including a cap plate that has an upper plane and a lower plane covering an opening of the open top of the can, a protection circuit board disposed on the top of the cap assembly, a mold resin part formed between the upper plane of the cap plate and the protection circuit board, and a protrusion part formed on an edge of the upper plane of the cap plate. The protrusion part protrudes upwards from the upper plane of the cap plate and adheres to the mold resin part.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein:

FIG. 3b is a schematic front cross-sectional view illustrating the secondary battery including the can shown in FIG. 3a.

DETAILED DESCRIPTION OF THE INVENTION

Figure 1:
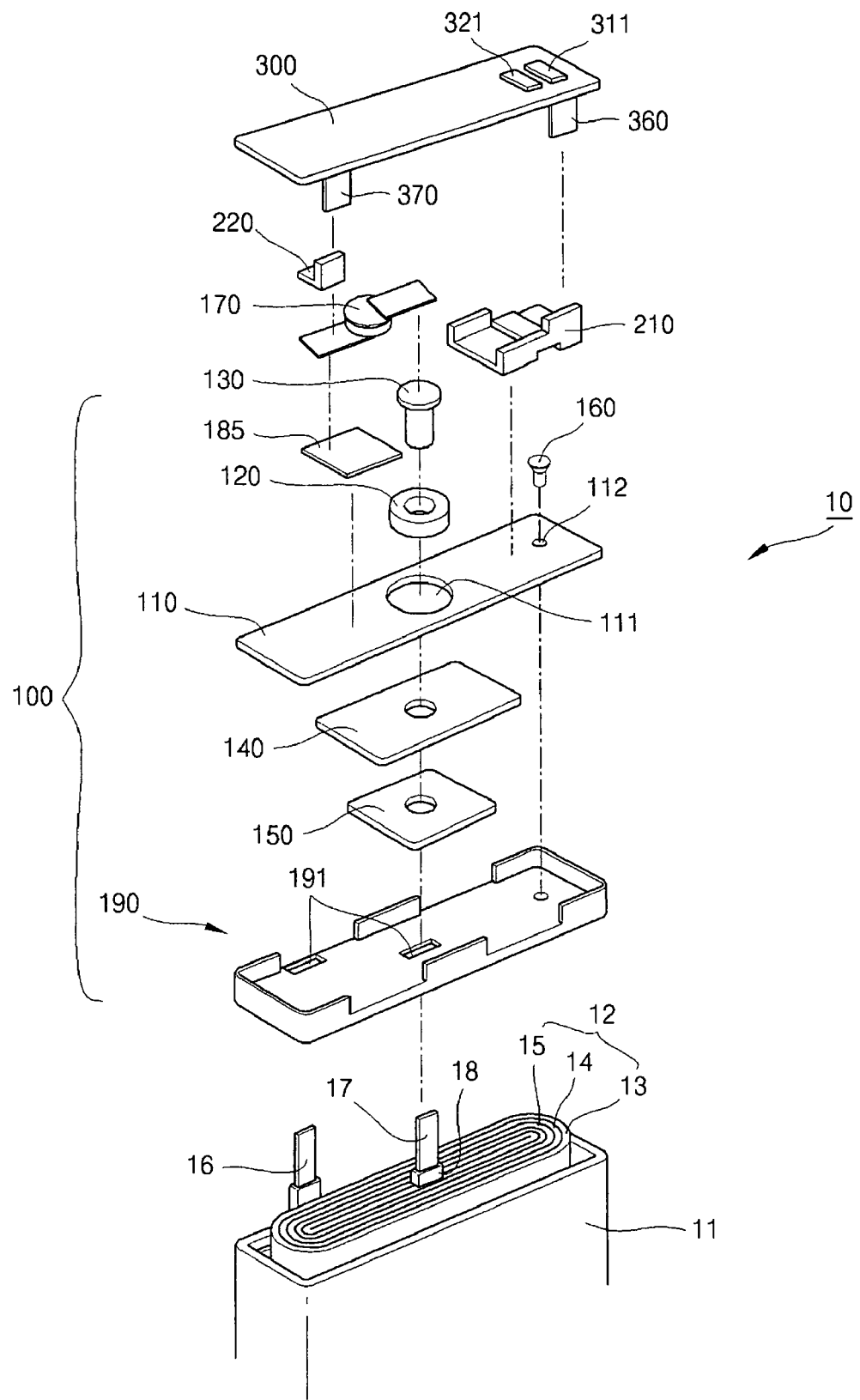
FIG. 1 is an exploded perspective view illustrating an assembly of a secondary battery constructed as one exemplary embodiment of the present invention.

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are only specific details provided to assist those of ordinary skill in the art in a comprehensive understanding of the invention, and the present invention is only defined within the scope of the appended claims. In the entire description of the present invention, the same drawing reference numerals are used for the same elements across various figures.

FIG. 1 is an exploded perspective diagram illustrating a secondary battery according to one embodiment of the present invention. Referring to FIG. 1, secondary battery 10 includes a bare cell, protection circuit board 300, and a mold resin part (not shown).

The bare cell includes electrode assembly 12, can 11 for accommodating electrode assembly 12, and cap assembly 100 attached to an opening formed on the top of can 11. Electrode assembly 12 is made by forming each of cathode electrode 13 and anode electrode 15 into a plate shape in order to increase electric capacity, by laminating anode electrode 15 and cathode electrode 13 with separator 14 interposed therebetween, and by winding the laminated electrodes into a jelly roll type. Cathode tab 16 and anode tab 17 are attached to cathode electrode 13 and anode electrode 15, respectively, and extended upwardly. Insulation tape 18 is wound around a portion of each of cathode tab 16 and anode tab 17, where each of cathode tab 16 and anode tab 17 begins to stick out of electrode assembly 12. Insulation tape 18 prevents electrical short that can occur between cathode electrode 13 and anode electrode 15.

Can 11 of secondary battery 10 is a container having a shape of rectangular parallelepiped, and has an open top and a side wall. Can 11 can be made of a metal material, and can be manufactured by deep drawing process. Therefore, can 11 also can be used as a terminal. Can 11 accommodates electrode assembly 12 and an electrolyte. Electrode assembly 12 is placed into can 11 through an opening formed on the top of can 11. After electrode assembly 12 is placed, the opening formed on the top of can 11 is sealed by cap assembly 100. The structure of can 11 will be described in detail later.

Cap assembly 100 includes cap plate 110, electrode terminal 130 installed through terminal through-hole 111 that is formed on cap plate 110, terminal plate 150 that is disposed under cap plate and electrically connected to electrode terminal 130, and insulation plate 140 that is placed between cap plate 110 and terminal plate 150. Gasket 120 is installed on electrode terminal 130 to prevent electrical short between cap plate 110 and electrode terminal 130. Insulation case 190 can be positioned between terminal plate 150 and electrode assembly 12 in order to prevent short circuit between terminal plate 150 and electrode assembly 12.

Anode electrode 15 of electrode assembly 12 is electrically connected to electrode terminal 130 through anode tab 17 and terminal plate 150. Cathode electrode 13 of electrode assembly 12 is electrically connected to cap plate 110 through cathode tab 16.

If insulation case 190 is provided, cathode tab 16 and anode tab 17 are supported by holes 191 formed on insulation case 190. The locations of anode tab 17 and cathode tab 16 can be switched to each other. In this case, the polarities of electrode terminal 130 and cap plate 110 also can be switched.

Electrolyte inlet 112 is formed on one side of cap plate 110 in order to inject an electrolyte into can 11. Electrolyte inlet 112 is sealed by sealing part 160 after injecting an electrolyte into can 11.

Protection circuit board 300 includes a panel made of resin and a protection circuit formed on the panel. The protection circuit protects the battery from getting overcharged or overdischarged during charging/discharging process, and is electrically connected with first connection terminal 360 and second connection terminal 370. First connection terminal 360 is electrically connected to cap plate 110 through first lead plate 210, and has positive polarity. Second connection terminal 370 is electrically connected to electrode terminal 130 through second lead plate 220 and positive temperature coefficient (PTC) element 170, and has a negative polarity. Insulation member 185 is provided for electrical insulation between PTC element 170 and cap plate 110. Second lead plate 220 and PTC element 170 can be replaced with a thermal breaker. First connection terminal 360 and second connection terminal 370 are electrically connected to input terminal 311 and output terminal 321, respectively, to be connected to an external electrical or electronic device.

A mold resin part (not shown) is formed between cap plate 110 and protection circuit board 300 by filling hot melting resin into a space formed between cap plate 110 and protection circuit board 300, followed by solidification. The mold resin part protects components, which are installed in the space between cap plate 110 and protection circuit board 300, from being dislocated. It is necessary that the mold resin part should secure all component, which are installed between cap plate 110 and protection circuit board 300, from external force, such twist or bend, in order to protect the components.

Hereinafter, structures of can 11 and cap plate 110, which support the mold resin part and prevents the mold resin part from being distorted, will be explained in detail.

Figure 2A:
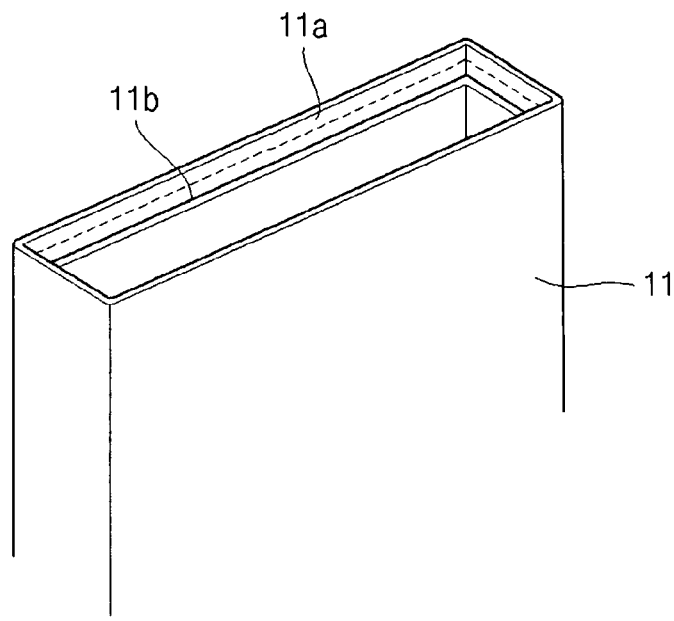
FIG. 2a is a perspective view illustrating a can of the secondary battery of FIG. 1.
Figure 2B:
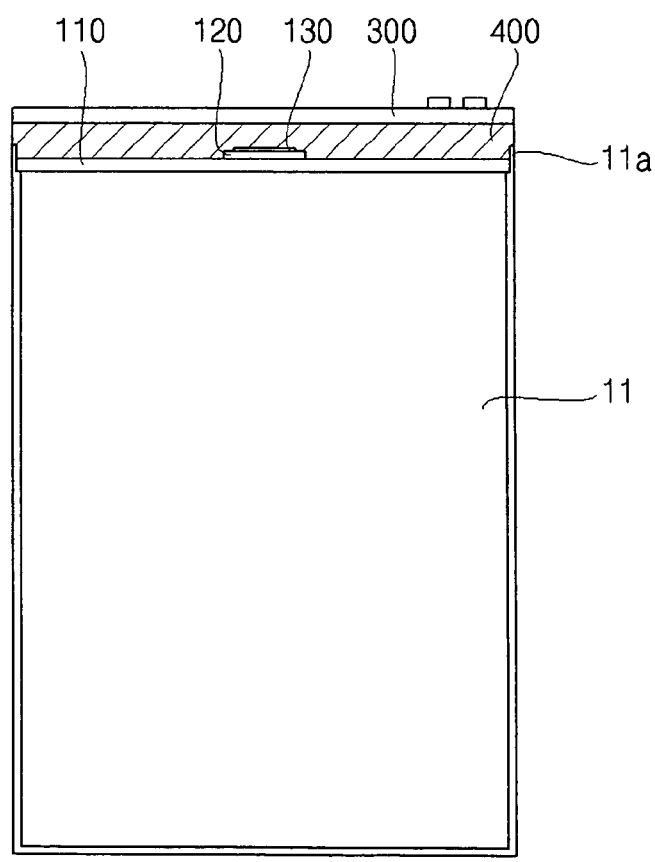
FIG. 2b is a schematic front cross-sectional view illustrating the secondary battery of FIG. 1.
Figure 2C:
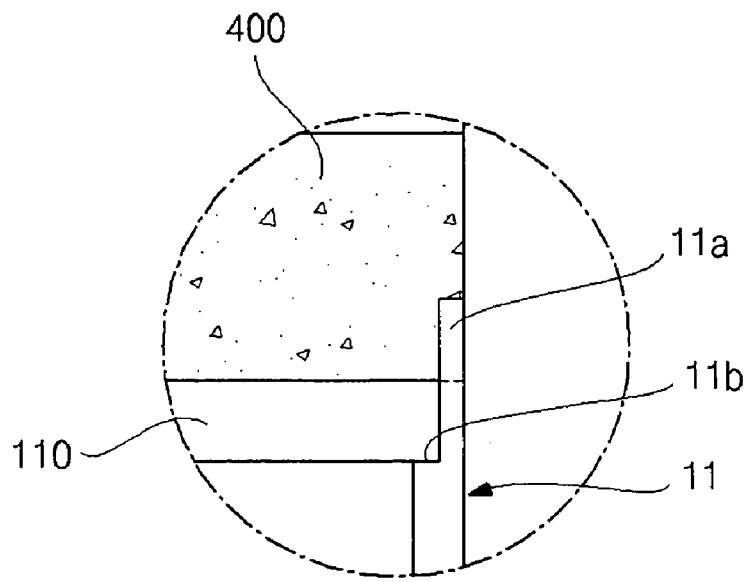
FIG. 2c is a partial expanded view magnifying the connection part of the can, a cap plate, and a mold resin part of the secondary battery of the one embodiment.

As shown in FIGS. 1 and 2a to 2c, can 11 has an open top, through which electrode assembly 12 is inserted, and a side wall that encloses electrode assembly 12 accommodated in can 11. Referring to FIGS. 2a to 2c, side wall extension part 11a is formed on an upper edge of the side wall of can 11. Side wall extension part 11a protrudes upwards from the top edge of the side wall of can 11 beyond cap plate 110. Mold resin part 400 formed between cap plate 110 and protection circuit board 300, and adheres to side wall extension part 11a.

In FIGS. 2a and 2c, a dotted line indicates a region, below which cap plate 110 is located. Cap plate 110 has an upper plane and a lower plane, and the upper plane of cap plate 110 is positioned at around the dotted line (refer to FIG. 2c for a close-up view). Herein, side wall extension part 11a is defined as a part that protrudes above the dotted line, where an edge of the upper plane of cap plate 110 contacts the side wall of can 11. The bottom end of side wall extension part 11a is about the same vertical level with the upper plane of cap plate 110. Therefore, side wall extension part 11a protrudes upwards above the upper plane of cap plate 110, and an inner side surface of side wall extension part 11a contacts mold resin part 400. Side wall extension part 11a can be a single piece surrounding mold resin part 400 as shown in FIG. 2a, or it is also possible to form a plurality of side wall extension parts 11a along the top edge of the side wall of can 11. In latter case, the side wall extension parts can be coupled to each other, and an inner side surface of each of side wall extension parts 11a contacts mold resin part 400. Therefore, side wall extension part 11a increases the contact area with mold resin part 400, and effectively supports mold resin part 400, and therefore it is more effective to prevent mold resin part 400 from being twisted or bent. The structure of side wall extension part 11a is not limited to the structures described above, and there can be various structures and arrangements of the side wall extension parts to achieve the goal of the present invention.

It is desirable that an angle between the inner side surface of side wall extension part 11a and the upper plane of cap plate 110 is approximately 90 degrees. As shown in FIGS. 2b and 2c, mold resin part 400 adheres to both of the inner side surface of side wall extension part 11a and the upper plane of cap plate 110. When the angel between the inner side surface of side wall extension part 11a and the upper plane of cap plate 110 is approximately 90 degrees, the side surface and the bottom of mold resin part 400, which adheres to the inner side surface of side wall extension part 11a and the upper plane of cap plate 110, respectively, forms a right angle. If the angle between the inner side surface of side wall extension part 11a and the upper plane of cap plate 110 is acute (less than 90 degrees), it is difficult to install cap plate 110 inside can 11. If the angle between the inner side surface of side wall extension part 11a and the upper plane of cap plate 110 is obtuse (greater than 90 degrees), resistance against external force, such twist, bend or others, becomes weaker, and side wall extension part 11a does not effectively support mold resin part 400.

Referring to FIGS. 2b and 2c, the height of side wall extension part 11a is smaller than the height of mold resin part 400. Herein, the height of side wall extension part 11a is defined as a distance between the top end and the bottom end of side wall extension part 11a. As described above, the bottom end of side wall extension part 11a is about the same vertical level with the upper plane of cap plate 110. Height of mold resin part 400 is a distance between the top surface of mold resin part 400, which contacts protection circuit board 300, and the bottom surface of mold resin part 400, which contacts cap plate 110. Mold resin part 400 adheres to the upper surface of side wall extension part 11a as well as the inner side surface of side wall extension part 11a. Because the height of side wall extension part 11a is smaller than the height of mold resin part 400, there is a gap between the top end of side wall extension part 11a and the top surface of mold resin part 400, and accordingly, interaction between side wall extension part 11a and protection circuit board 300 can be avoided. The structure of side wall extension part 11a of the present invention, however, is not limited thereto. Depending on design of a battery, the height of side wall extension part 11a can be almost the same as the height (or thickness) of mold resin part 400, and side wall extension part 11a can touch protection circuit board 300.

Referring to FIGS. 2a and 2c, seating groove 11b is formed on an inner side surface of the side wall of can 11, and is coupled to cap plate 110. As shown in FIG. 2c, cap plate 110 can be seated on seating groove 11b. Therefore, cap plate 110 covers the opening of the open top of can 11. Edges of the upper plane of cap plate 110, which contacts the side wall of can 11, are welded to the side wall of can 11 by laser welding method, and are sealed.

Although not shown in the drawings, one of connection terminals 360 and 370 installed in protection circuit board 300 can be electrically connected to side wall extension part 11a. In the above descriptions, first connection terminal 360 is described to be electrically connected to cap plate 110. According to one embodiment of the present invention, however, it is possible to connect, for example, first connection terminal 360 to side wall extension part 11a, because side wall extension part 11a is formed higher than cap plate 110. For example, one of first and second connection terminals 360 and 370 of protection circuit board 300 can be connected to side wall extension part 11a either directly or through a safety device, such as a PTC element, a thermal breaker, and others. Accordingly, a free space can be created on the upper plane of the cap plate 110 by removing components that are necessary to connect the connection terminal to the cap plate.

Figure 3A:
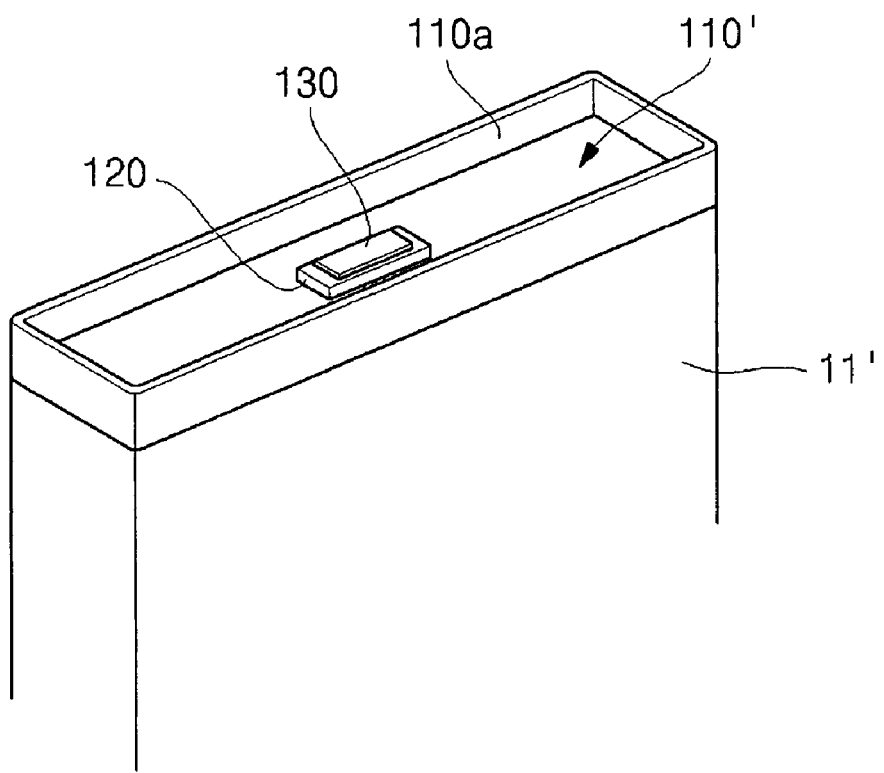
FIG. 3a is a perspective view illustrating a can of a secondary battery constructed as another exemplary embodiment of the present invention.
Figure 3B:
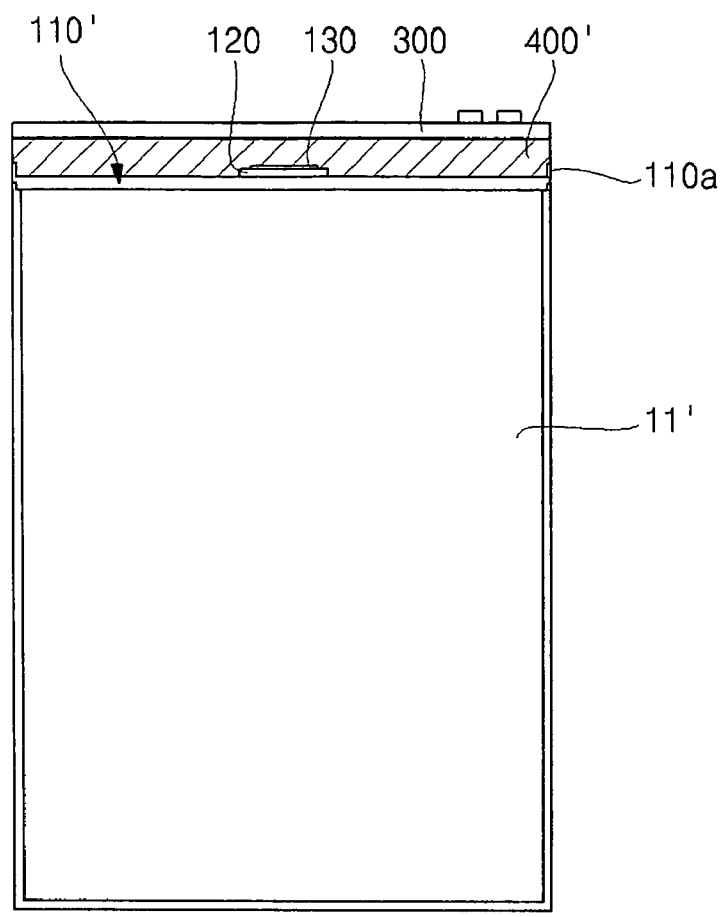
Figure 3C:
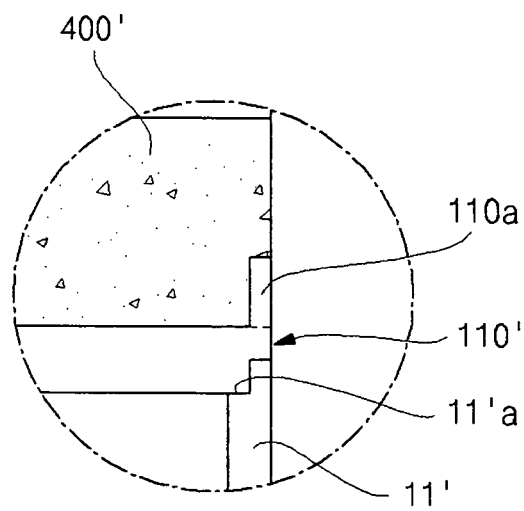
FIG. 3c is a partial expanded view magnifying the connection part of the can, a cap plate, and a mold resin part of the secondary battery of the another embodiment.

FIGS. 3a to 3c illustrate another embodiment of the present invention. Referring to FIGS. 3a to 3c, a part of an edge of cap plate 110' protrudes upwards from the upper plane of cap plate 110'. Protrusion part 110a of cap plate 110' adheres to mold resin part 400'.

In FIG. 3a, the entire edge of cap plate 110' protrudes upwards from the upper plane of cap plate 110', while cap plate 110' covers the opening of the open top of can 11'. Cap plate 110' contacts the top edge of the side wall of can 11'. Mold resin part 400' is formed between cap plate 110' and protection circuit board 300, and the inner side surface of protrusion 110a contacts mold resin part 400'. In this case, protrusion part 110a of cap plate 110' increases the contact area with mold resin part 400', and more effectively prevents mold resin part 400' from being twisted or bent. Protrusion part 110a of cap plate 110' can be a single piece surrounding mold resin part 400 as shown in FIG. 3a, or it is also possible to form a plurality of protrusion parts 110a along the edge of the upper plane of cap plate 110'. In latter case, the protrusion parts can be coupled to each other. The structure of protrusion part 110a is not limited to the structures described in this paragraph, and there can be various structures and arrangements of the protrusion parts to achieve the goal of the present invention.

It is desirable that an angle between the inner side surface of protrusion part 110a and the upper plane of cap plate 110' is approximately 90 degrees. As shown in FIGS. 3b and 3c, mold resin part 400' adheres to both of the inner side surface of protrusion part 110a and the upper plane of cap plate 110'. When the angle between the inner side surface of protrusion part 110a and the upper plane of cap plate 110' is approximately 90 degrees, the angel between the side surface and the bottom of mold resin part 400' is about 90 degrees. If the angle between the inner side surface of protrusion part 110a and the upper plane of cap plate 110' is acute (less than 90 degrees), the upper portion of mold resin part 400' becomes narrower (such as a pyramid shape), and post-processes of the battery becomes difficult. If the angle between the inner side surface of protrusion part 110a and the upper plane of cap plate 110' is obtuse (greater than 90 degrees), resistance against external force, such as twist, bend or others, becomes weaker, and protrusion part 110a does not effectively support mold resin part 400'.

Referring to FIGS. 3b and 3c, the height of protrusion part 110a is smaller than the height of mold resin part 400'. The bottom end of protrusion part 110 is the portion that contacts the upper surface of cap plate 110', as indicated with a dotted line shown in FIG. 3c. Therefore, the height of protrusion part 110a of cap plate 110' is defined as a distance between the top end and the bottom end of protrusion part 110a. Height of mold resin part 400 is a distance between the top surface of mold resin part 400, which contacts protection circuit board 300, and the bottom surface of mold resin part 400, which contacts cap plate 110'. Mold resin part 400 adheres to the upper surface of protrusion part 110a as well as the inner side surface of protrusion part 110a. Because the height of protrusion part 110a is smaller than the height of mold resin part 400', there is a gap between the top end of protrusion part 110a and the top surface of mold resin part 400', and accordingly, interaction between protrusion part 110a and protection circuit board 300 can be avoided. The structure of protrusion part 110a of the present invention, however, is not limited thereto. Depending on design of a battery, the height of protrusion part 110a can be almost the same as the height of mold resin part 400', and protrusion part 110a can touch protection circuit board 300.

Referring to FIGS. 3a and 3c, seating groove 11'a is formed on an inner side surface of the side wall of can 11' and is coupled to cap plate 110'. Cap plate 110' can be seated on seating groove 11'a. Therefore, cap plate 110' covers the opening of the open top of can 11'. Edges of the upper plane of cap plate 110', which contacts the side wall of can 11', are welded to the side wall of can 11' by laser welding method, and are sealed.

Although not shown in the drawings, one of connection terminals 360 and 370 installed in protection circuit board 300 can be electrically connected to protrusion part 110a. In the above descriptions referring to FIG. 1, first connection terminal 360 is described to be electrically connected to cap plate 110'. According to one embodiment of the present invention, however, it is possible to connect, for example, first connection terminal 360 to protrusion part 110a, because protrusion part 110a is formed higher than cap plate 110'. For example, one of first and second connection terminals 360 and 370 of protection circuit board 300 can be connected to protrusion part 110a either directly or through a safety device, such as a PTC element, a thermal breaker, and others. Accordingly, a free space can be created on the upper plane of the cap plate 110' by removing components that are necessary to connect the connection terminal to the cap plate.

In the secondary battery constructed according to the principles of the present invention, a protrusion part (or a side wall extension part) is formed either on a top edge of a side wall of a can or on an edge of an upper plane of a cap plate, and the protrusion part adheres to a mold resin part. Therefore, the secondary battery has advantages that the battery can prevent the mold resin part from being twisted and bent, and therefore increases reliability of the battery.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A secondary battery, comprising:
   a can having an open top and a side wall;
   an electrode assembly accommodated inside the can and producing electricity;
   a cap assembly disposed on the top of the can, the cap assembly including a cap plate that has a plane covering an opening of the open top of the can;
   a protection circuit board disposed on the top of the cap assembly, the protection circuit board being electrically connected to the electrode assembly;
   a mold resin part formed between the cap plate and the protection circuit board; and
   a side wall extension part formed on a top edge of the side wall of the can, the side wall extension part protruding upwards beyond the cap plate, the side wall extension part adhering to the mold resin part.

2. The secondary battery of claim 1, comprised of the side wall extension part protruding in a direction substantially perpendicular to the plane of the cap plate.

3. The secondary battery of claim 1, comprised of the side wall extension part having a height being smaller than a height of the mold resin part.

4. The secondary battery of claim 1, comprised of the can including a seating groove formed on an inner side surface of the side wall of the can, the seating groove being coupled to the cap plate.

5. The secondary battery of claim 1, further comprising a connection terminal connected to the protection circuit board, the connection terminal being electrically connected to the side wall extension part.

6. The secondary battery of claim 1, comprised of the cap plate being electrically connected to the electrode assembly.

7. A secondary battery, comprising:
   a can having an open top and a side wall;
   an electrode assembly accommodated inside the can and producing electricity;
   a cap assembly disposed on the top of the can, the cap assembly including a cap plate that has an upper plane and a lower plane covering an opening of the open top of the can;
   a protection circuit board disposed on the top of the cap assembly, the protection circuit board being electrically connected to the electrode assembly;
   a mold resin part formed between the upper plane of the cap plate and the protection circuit board; and
   a protrusion part formed on an edge of the upper plane of the cap plate, the protrusion part protruding upwards from the upper plane of the cap plate, the protrusion part adhering to the mold resin part.

8. The secondary battery of claim 7, comprised of the protrusion part protruding in a direction substantially perpendicular to the upper plane of the cap plate.

9. The secondary battery of claim 7, comprised of the protrusion part having a height being smaller than a height of the mold resin part.

10. The secondary battery of claim 7, comprised of the can including a seating groove formed on an inner side surface of the side wall of the can, the seating groove being coupled to the cap plate.

11. The secondary battery of claim 7, further comprising a connection terminal connected to the protection circuit board, the connection terminal being electrically connected to the protrusion part.

12. The secondary battery of claim 7, comprised of the cap plate being electrically connected to the electrode assembly.

* * * * *